United States Patent
Adams

(10) Patent No.: US 6,821,313 B2
(45) Date of Patent: Nov. 23, 2004

(54) REDUCED TEMPERATURE AND PRESSURE POWDER METALLURGY PROCESS FOR CONSOLIDATING RHENIUM ALLOYS

(75) Inventor: Robbie J. Adams, Phoenix, AZ (US)

(73) Assignee: Honeywell International, Inc., Morristown, NJ (US)

(*) Notice: Subject to any disclaimer, the term of this patent is extended or adjusted under 35 U.S.C. 154(b) by 8 days.

(21) Appl. No.: 10/243,445

(22) Filed: Sep. 13, 2002

(65) Prior Publication Data

US 2003/0223903 A1 Dec. 4, 2003

Related U.S. Application Data

(60) Provisional application No. 60/284,737, filed on May 31, 2002, and provisional application No. 60/384,631, filed on May 31, 2002.

(51) Int. Cl.[7] ............................................. C22C 27/00
(52) U.S. Cl. ............................................. 75/247; 75/236
(58) Field of Search .................... 75/236, 247; 420/433

(56) References Cited

U.S. PATENT DOCUMENTS

| | | | |
|---|---|---|---|
| 2,467,675 A | 4/1949 | Kurtz et al. .................... 75/22 |
| 3,378,392 A | 4/1968 | Longo ......................... 117/93.1 |
| 3,969,186 A | 7/1976 | Thompson et al. ........... 176/68 |
| 4,067,742 A | 1/1978 | Fletcher et al. ............... 106/43 |
| 4,119,458 A | 10/1978 | Moore ........................... 75/170 |
| 4,155,660 A | 5/1979 | Takahashi et al. ........... 400/124 |
| 4,380,471 A | 4/1983 | Lee et al. ...................... 419/11 |
| 4,432,794 A | 2/1984 | Holleck ......................... 75/239 |
| 4,764,225 A | 8/1988 | Shankar et al. ............. 148/404 |
| 4,915,733 A | 4/1990 | Schütz et al. ................. 75/228 |
| 4,927,798 A | 5/1990 | Baldi ........................... 502/301 |
| 4,985,051 A | 1/1991 | Ringwood .................... 51/309 |
| 5,262,202 A | 11/1993 | Garg et al. .............. 427/383.3 |
| 5,476,531 A | 12/1995 | Timm et al. .................. 75/240 |
| 5,577,263 A | 11/1996 | West ........................... 428/552 |
| 5,704,538 A | 1/1998 | Mittendorf .................. 228/194 |
| 5,722,034 A | 2/1998 | Kambara ...................... 419/26 |
| 5,730,792 A | 3/1998 | Camilletti et al. ...... 106/287.14 |
| 5,745,834 A | 4/1998 | Bampton et al. .............. 419/37 |
| 5,824,425 A | 10/1998 | Mittendorf ................... 428/655 |
| 5,853,904 A | 12/1998 | Hall et al. .................... 428/670 |
| 5,928,799 A | 7/1999 | Sherman et al. ............. 428/655 |
| 5,993,980 A | 11/1999 | Schmitz et al. .............. 428/633 |
| 6,039,920 A | 3/2000 | Koch et al. ................... 420/590 |
| 6,127,047 A | 10/2000 | Worrell et al. ............... 428/615 |
| 6,203,752 B1 | 3/2001 | Bewlay et al. .................. 419/6 |
| 6,284,357 B1 | 9/2001 | Lackey et al. .............. 428/220 |

FOREIGN PATENT DOCUMENTS

| | | | |
|---|---|---|---|
| CH | 221059 A | 5/1942 | |
| EP | 1 123 908 A1 | 8/2001 | ........... C04B/35/38 |
| GB | 1114850 | 5/1968 | |
| SU | 1804141 | 5/1996 | |
| WO | WO 93/07302 A | 4/1993 | |
| WO | WO 01/68557 A1 | 9/2001 | |
| WO | PCT/US 03/17037 | 9/2003 | |

OTHER PUBLICATIONS

Schatt, W. et al.: "Pulvermetallurgie; Sinter–und Verbundwerkstoffe"; Aug. 15, 1977 , Veb Deutscher Verlag Fur Grundstoffindustrie, Leipzig, GDR XP002251863 177780.

Primary Examiner—Ngoclan T. Mai
(74) Attorney, Agent, or Firm—Douglas A. Mullen, Esq.

(57) ABSTRACT

Pressure powder metallurgy process for consolidating refractory or rhenium alloys using a reduced temperature and elevated pressure. Rhenium metal has high temperature strength and wear resistance but has a very high melting point as a pure metal and thus is difficult to use as a coating for many alloys having lower melting points. The reduced temperature and elevated pressure alloying process of the rhenium allows it to be used as a coating for other metal alloys, such as nickel and steel alloys, providing some high temperature and wear resistance due to the properties of the rhenium material in the coating.

12 Claims, No Drawings

REDUCED TEMPERATURE AND PRESSURE POWDER METALLURGY PROCESS FOR CONSOLIDATING RHENIUM ALLOYS

CROSS-REFERENCES TO RELATED APPLICATIONS

This patent application claims the benefit of U.S. Provisional Applications 60/284,737 for Reduced Temperature And Pressure Powder Metallurgy Process For Consolidating Rhenium Alloys and 60/384,631 for Use of Powdered Metal Sintering/Diffusion Bonding to Enable Applying Silicon Carbide or Rhenium Alloys to Face Seal Rotors, both filed on May 31, 2002. This patent application is also related to U.S. patent application Ser. No. 10/138,090 filed May 3, 2002 for Oxidation and Wear Resistant Rhenium Metal Matrix Composite, and U.S. patent application Ser. No. 10/138,087 filed May 3, 2002 for Oxidation Resistant Rhenium Alloys. All the foregoing applications are incorporated by reference.

BACKGROUND OF THE INVENTION

1. Field of the Invention

This invention relates refractory metal alloys and to powder and other metallurgy processes for consolidating rhenium alloys at reduced temperatures and pressures so that rhenium alloys may be used as coatings for alloys that have lower melting points than rhenium itself, such as steel and nickel alloys, as well as structural shapes where the entire object is made of rhenium alloy.

2. Description of the Related Art

In certain aerospace industry applications, a device's operating efficiency can be increased by increasing the operating temperature for the device. At these elevated temperatures, strength can be reduced and wear can accelerate for many materials. Wear resistant coatings exist today, but the expense of applying them to conventional substrate materials, such as steel, nickel, and other conventional high temperature alloys, reduces their cost effectiveness.

One group of materials that can have excellent wear rates is refractory metals. However, they are expensive and heavy and so are generally relegated to use as coatings, as whole-part fabrication can be difficult and expensive. Some of such refractory metals have high temperature strength and/or adequate wear resistance but, because their melting temperatures are so much higher than the substrate materials, they can be difficult to use.

Powder metallurgy can be used to fabricate and/or coat cheaper substrate materials with more wear-resistant coatings. Powder metallurgy can use a forming and sintering process for making various parts out of metal powder. After a component has been generally shaped by forming or molding sintering is a high temperature process that can be used to develop the final material properties of the component. It can involve heating the powder to temperatures below the melting point of the major constituent in an inert atmosphere to protect against oxidation. Temperatures of approximately 80% of the melting point of the main constituent material can be used so as not to melt the component and affect its shape. Popular raw materials used in the production of powder metallurgy components are metal powders. These consist of fine, high purity metal powders produced by processes such as atomization, pulverization, chemical reduction, electrolytic techniques or mechanical alloying. Of these processes, atomization is a popular technique. In one process, the metal powder is compacted by injecting it into a closed metal cavity (the die) under pressure. This compacted material is placed in an oven and sintered in a controlled atmosphere at high temperatures, and the metal powders coalesce and form a solid. A second pressing operation, repressing, can be done prior to sintering to improve the compaction and the material properties.

Rhenium (chemical element symbol Re) is one such refractory metal that is useable for powder metallurgy. It melts at 5,741° F. (3,172° C., 3,445° K) and consolidating it by powder metallurgy can occur at approximately 3,272° F. (1,800° C., 2,073° K) and 20,000 to 30,000 psi pressure. Since steel alloys melt near 2,700° F. (1,482° C., 1,755° K) and nickel alloys melt near 2,500° F. (1,371° C., 1,644° K), conventional powder metallurgy techniques generally are not suitable for coating these metal substrates or any others with a melting temperature below the consolidation temperature or with very low strength at these temperatures.

In view of the foregoing, there is a need for a cost effective, robust reduced temperature and/or pressure powder metallurgy process for refractory metals that addresses one or more of the drawbacks identified above. The present invention satisfies one or more of these needs.

SUMMARY OF THE INVENTION

This invention dramatically reduces the temperature and pressure required for consolidation of rhenium by including lower temperature constituents that have full or partial solubilities with rhenium. These additions contribute to consolidating the individual rhenium particles to each other most likely through enhanced diffusion and deformability at the particle interface. As a result, the cost is reduced, making the material's use more cost effective. In addition, these constituents can enhance the oxidation resistance of the alloy. The oxidation resistance and an application for face seal and ceramic encapsulation is described in more detail in incorporated by reference U.S. patent application Ser. Nos. 10/138,090 and 10/138,087. The alloy elements used to date include cobalt, nickel, chromium and manganese. This approach has succeeded and enabled the coating of steel discs for use in face seals as noted in the provisional application referenced above.

An exemplary pressure powder metallurgy process for creating a rhenium alloy may include the steps of providing a first powder of a refractory alloy, providing a second powder of at least a second metal, the second metal being partially or fully soluble with the refractory alloy, mixing the refractory alloy and second powder to provide a mixture, and heating the mixture under pressure to fuse the refractory alloy with the second powder so as to form an alloy in a manner that high temperatures may be avoided, yet the refractory alloy and second powders may be fused.

An exemplary refractory metal alloy produced by the present invention may include is rhenium, where rhenium comprises the largest constituent of the alloy by atomic weight, and a metal selected from the group consisting of cobalt, chromium, manganese and nickel.

Another exemplary metal alloy produced by the present invention may include at least 50% by atomic weight refractory metal, and a metal selected from the group of cobalt, chromium, manganese and nickel.

Other features and advantages of the present invention will become apparent from the following description of the preferred embodiment(s), taken in conjunction with the accompanying drawings, which illustrate, by way of example, the principles of the invention.

DESCRIPTION OF THE PREFERRED EMBODIMENT(S)

The detailed description set forth below in connection with the appended drawings is intended as a description of presently—preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

As previously stated, popular raw materials used in the production of powder metallurgy components are the metal powders. These consist of fine, high purity metal powders produced by processes such as atomization, pulverization, chemical reduction, electrolytic techniques or mechanical alloying. Of these processes, atomization is one popular technique. Lubricants may be added to the metal powders to reduce friction between powders and pressing dies, which in turn reduces pressure gradients. The raw materials are formed into shapes using pressure-based techniques such as cold uniaxial pressing, metal injection molding, cold isostatic pressing, hot isostatic pressing or hot forging. The latter two processes also combine the forming and sintering processes into a single process.

Compaction of the raw materials at high pressures forms a preliminarily-shaped component, also called a "green shape", where the particles bond together by mechanical interlocking and/or cold welding. Pressing at sufficiently high pressures gives the green shape enough strength to be handled and machined. The amount of compression experienced by the powder during the forming process will tend to relate to its green density. This in turn can control the amount of shrinkage/growth the powder compact will undergo during the sintering process. It will also influence the physical properties of the final component. Sintering is a high temperature process used to improve the mechanical properties of the component. It can involve heating to temperatures below the melting point of the major constituent in an inert atmosphere to protect against oxidation. During the sintering process, adjacent particles bond together by solid state diffusion processes. As mentioned earlier, processes such as hot isostatic pressing (HIP) and hot forging combine the sintering and forming process into a single stage.

Sometimes secondary operations are used to improve surface finish or make sure components fall within required tolerances. Such operations may include, milling, drilling, grinding, repressing. Density and strength can also be increased by a secondary sintering and/or repressing operations. Sometimes, porous metal components are deliberately produced so that they can be infiltrated with secondary materials. Further, components can be produced such that they have interconnected pores, or capillary pores. These can be infiltrated with oil or other lower melting point metals. For this to work properly, oxide free pores may be required, which could be produced by processing in an inert atmosphere.

The HIP process provides a method for producing components from diverse powdered materials, including metals and ceramics. During the manufacturing process, a powder mixture of several elements is placed in a container, typically a steel can. The container is subjected to an elevated temperature and a very high vacuum to remove air and moisture from the powder. The container is then sealed and HIP'ed. The application of high inert gas pressures and elevated temperatures results in the removal of internal voids and creates a strong metallurgical bond throughout the material. The result is a clean homogeneous material with a uniformly fine grain size and a near 100% density. The reduced porosity of HIP'ed materials enables improved mechanical properties and increased workability. The HIP process eliminates internal voids and creates clean, firm bonds and fine, uniform microstructures. These characteristics generally are not possible with conventional welding or casting. The substantial reduction or virtual elimination of internal voids enhances component performance and improves fatigue strength. The process also results in significantly improved non-destructive examination ratings.

One alloy, designated Honeywell Alloy 30, has a nominal composition of 20% cobalt, 15% chromium, 5% manganese and 60% rhenium. Another alloy, HRA 33, has a composition of 20% cobalt, 10% nickel, 10% chromium, and 5% manganese with the balance of 55% being rhenium. Ceramic materials can be encapsulated in the alloy HRA 35 with a composition of 15% silicon carbide (SiC), 10% nickel (Ni), 10% cobalt (Co), 10% chromium (Cr), 5% manganese (Mn), and 50% rhenium. The percentages set forth herein are generally atomic percentages.

These alloys have been consolidated at temperatures as low as 1,000° C. (1,832° F., 1,273° K) and as high as 1,800° C. (3,272° F., 2,073° K), and pressures as low as 250 psi and as high as 14,000 psi. However, a temperature of 1,000° C. (1,832° F., 1,273° K) and a pressure between 2000 and 3000 psi results in almost zero porosity and little if any deformation of substrates. Typically, the temperature must be somewhat higher for lower pressures.

Likewise, when the pressure is higher, the temperature may be lowered. In summary, the range of at least partial consolidation is bounded on the lower end of pressure by 250 psi. To date, the lowest limit of temperature tried by the inventor is 1,000° C. (1,832° F., 1,273° K) but a preferred temperature is 1,100° C. (2,012° F., 1,373° K). Lower temperatures may work but have not yet been tried. The upper limit of temperature is generally bounded by the element with highest vapor pressure and the strength of the substrate at the temperature of interest. For example, at 1,500° C. (2,732° F., 1,773° K) large voids are quickly formed internally in the chromium areas, most likely due to chromium vaporization. In addition, since many steel alloys lose strength rapidly as the temperature approaches 1,200° C. (2,192° F., 1,473° K), the part is deformed even with relatively low pressures if the temperature is too high.

The best results have been achieved with rhenium combined with multiple alloy constituents, but are also achievable with only chromium, nickel, cobalt or manganese added individually to pure rhenium. The alloy combinations with a rhenium base assist in oxidation resistance.

In operation, a pressure powder metallurgy process for creating a rhenium alloy includes providing a first powder of rhenium, providing a second powder of at least a second metal, the second metal being partially or fully soluble with rhenium, mixing the rhenium and the second powder to provide a mixture, and heating the mixture under pressure to fuse the rhenium with the second powder so as to form an alloy where temperatures significantly below 80% of the melting point of rhenium may be used, yet the rhenium and the second powder may be fused. The second powder in the process may be any one of cobalt, chromium, manganese nickel, or various combinations of these metals, depending on the intended use of the final product. In addition, ceramic materials such as silicon carbide may also be added to the second powder to control desired properties, for example, insulation properties, thermal conductivity, and/or electrical conductivity, among others.

While the present invention has been described with reference to a preferred embodiment or to particular embodiments, it will be understood that various changes and additional variations may be made and equivalents may be substituted for elements thereof without departing from the scope of the invention or the inventive concept thereof.

Particularly, other refractory metals may be substituted for rhenium. One such metal is tungsten (chemical symbol W). The processes disclosed herein may be adapted for other refractory materials. Generally, the alloys and materials disclosed herein have a refractory metal as a, or the, major constituent and may generally have a refractory metal, such as rhenium or tungsten, as the majority constituent.

In addition, many modifications may be made to adapt a particular situation or material to the teachings of the invention without departing from the essential scope thereof. Therefore, it is intended that the invention not be limited to particular embodiments disclosed herein for carrying it out, but that the invention includes all embodiments falling within the scope of the appended claims.

What is claimed is:

1. A refractory metal alloy comprising:
   rhenium, wherein rhenium comprises at least 50% of the alloy by atomic weight, and further comprises at least 35% cobalt, chromium, and manganese by atomic weight.

2. The refractory metal alloy of claim 1, wherein cobalt comprises approximately 20% of the alloy by atomic weight.

3. The refractory metal alloy of claim 2, wherein manganese comprises approximately 5% of the alloy by atomic weight.

4. The refractory metal alloy of claim 3, wherein chromium comprises approximately 15% of the alloy by atomic weight.

5. The refractory metal alloy of claim 3, wherein chromium comprises approximately 10% of the alloy by atomic weight.

6. A refractory metal alloy comprising:
   rhenium, wherein rhenium comprises the largest constituent of the alloy by atomic weight, and further comprising silicon carbide, nickel, cobalt, chromium, and manganese.

7. The refractory metal alloy of claim 6, wherein nickel comprise approximately 10% of the alloy by atomic weight.

8. The refractory metal alloy of claim 7, wherein cobalt comprises approximately 10% of the alloy by atomic weight.

9. The refractory metal alloy of claim 8, wherein chromium comprises approximately 10% of the alloy by atomic weight.

10. The refractory metal alloy of claim 9, wherein manganese comprises approximately 5% of the alloy by atomic weight.

11. The refractory metal alloy of claim 10, wherein silicon carbide comprises at least 14% of the alloy by atomic weight.

12. The refractory metal alloy of claim 12, further comprising nickel, wherein nickel comprises approximately 10% of the alloy by atomic weight.

* * * * *